United States Patent

[11] 3,611,950

| [72] | Inventors | Mario Battaglia<br>440 North Taylor Ave., South Hackensack;<br>Frank Chessari, 471 Hudson St., Hackensack, both of N.J. |
|---|---|---|
| [21] | Appl. No. | 872,078 |
| [22] | Filed | Oct. 29, 1969 |
| [45] | Patented | Oct. 12, 1971 |

[54] MANICOTTI-MAKING MACHINE
6 Claims, 4 Drawing Figs.

[52] U.S. Cl. ..................................... 107/1 A, 107/12, 107/68
[51] Int. Cl. ..................................... A21c 11/10
[50] Field of Search ........................... 107/1 A, 1 D, 4 A, 7 K, 12, 15 A, 54 D, 68

[56] References Cited
UNITED STATES PATENTS

| 2,303,351 | 12/1942 | Gage et al. | 107/1 D |
| 2,434,339 | 1/1948 | Stiles | 107/68 X |
| 2,714,861 | 8/1955 | Castronuovo | 107/1 A X |
| 2,905,105 | 9/1959 | Lombi | 107/1 A |
| 2,924,184 | 2/1960 | Welch | 107/12 |
| 2,960,045 | 11/1960 | Pentzlin | 107/1 A X |

FOREIGN PATENTS

| 1,037,870 | 8/1966 | Great Britain | 107/1 A |

Primary Examiner—Price C. Faw, Jr.
Attorney—Joseph E. Padlon

ABSTRACT: A manicotti-forming machine including means for forming a continuous sheet of dough from a mass thereof and conveying the dough sheet past a filler dispenser for depositing a controlled quantity of filler material onto the dough sheet, means cutting the dough sheet and deposited filler into increments of predetermined dimensions, and means folding the cut dough sheet about the deposited filler to form a completed manicotti unit ready for packing and shipping.

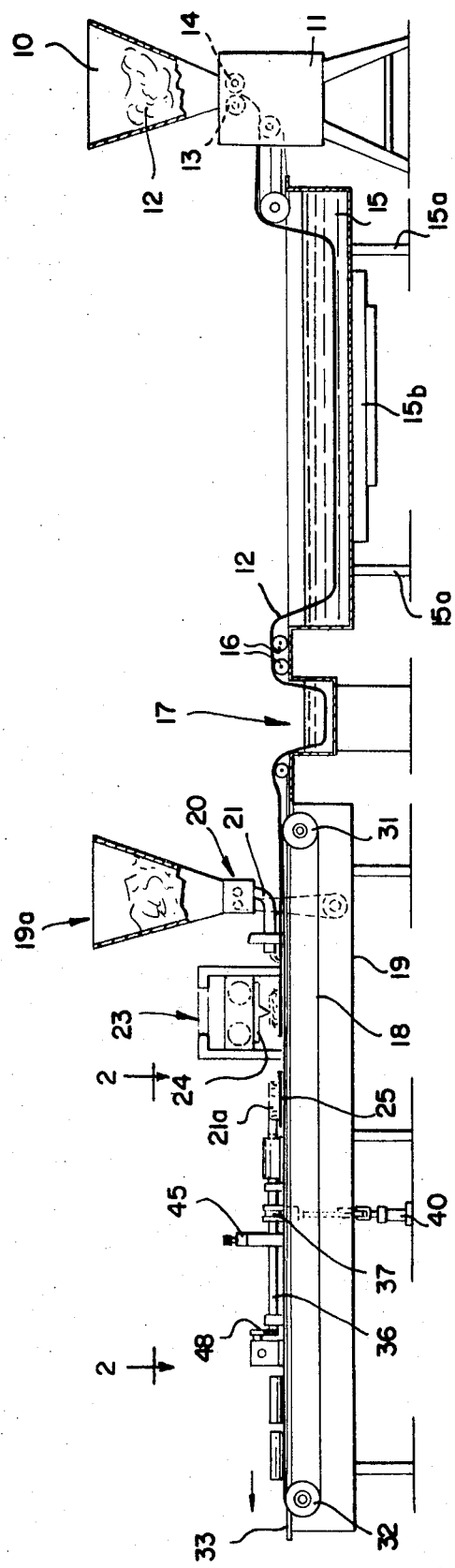
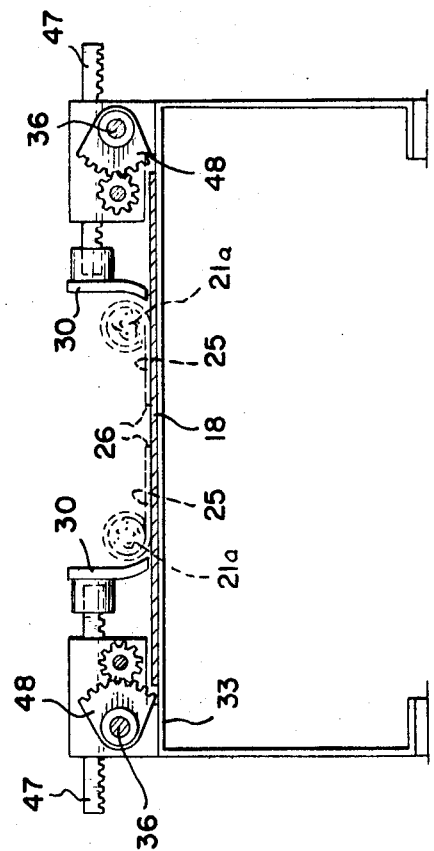

INVENTOR.
MARIO BATTAGLIA
FRANK CHESSARI

ATTORNEY

MANICOTTI-MAKING MACHINE

Figure 2:
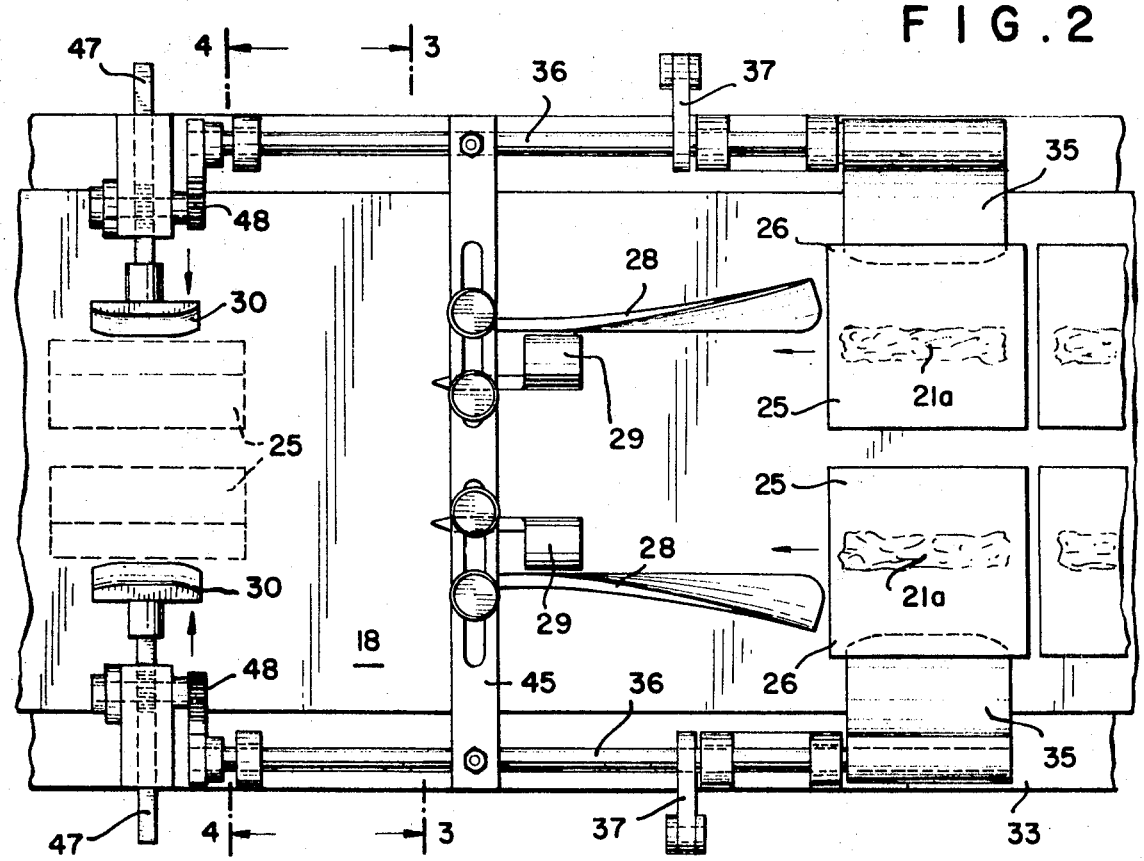
Figure 3:
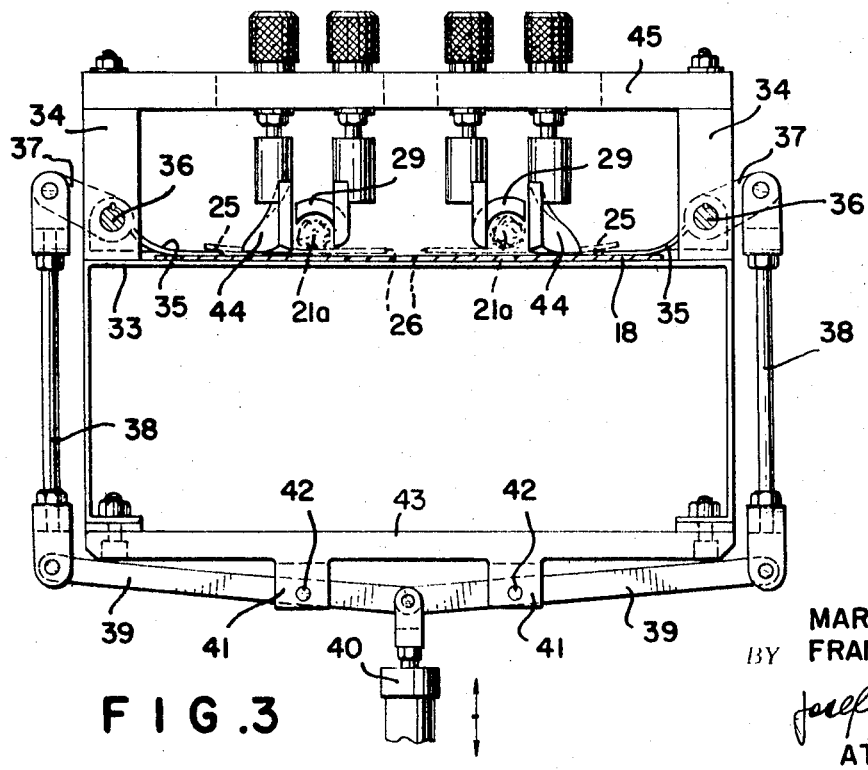

With the above features in view, a preferred embodiment of the invention is disclosed herein taken in conjunction with the accompanying drawing, in which FIG. 1 is a schematic view of the method used herein;
FIG. 2 is a plan view taken on line 2—2 of FIG. 1;
FIG. 3 is a sectional view taken on line 3—3 of FIG. 2; and
FIG. 4 is a sectional view taken on line 4—4 of FIG. 2.

Referring now to the drawing, wherein like numerals refer to like parts throughout, there is shown in FIG. 1 the different stages of operation for making manicotti. It is to be understood that manicotti is a plural word and may contain either ricotta cheese, heavy cottage cheese or finely ground meat. For purposes of simplicity, cheese manicotti will be referred to in the present description. Furthermore, the description of the process is given in order to more clearly understand the mechanism used in the making of completed manicotti.

Flour dough previously made is fed into a dough sheeter 10 mounted on a suitable support 11 wherein the dough 12 is continuously fed between rollers 13 and 14 and extruded in the form of a flat sheet into a hot water bath 15.

The water is heated to a sufficiently high temperature to cook the dough as it passes from one end of the bath to the other. Said bath 15 is mounted on supports 15a and provided with suitable means 15b, which may use electricity, gas or very hot water.

The cooked sheet is moved on rollers as shown and by the time it reaches the end of bath 15, it passes over actuated rollers 16 and into the cooling station 17 containing cold water which is a little below normal room temperature to congeal the dough sheet in the passage therethrough. After this congealing of the cooked dough, it is drawn by an operated endless conveyor belt 18 mounted on a support table 19 and moving in a left-handed direction of FIG. 1, as shown in FIG. 1. The speed of the belt can be adjusted depending on the speed of forming the finished product.

When the sheet is on the belt 18, it reaches a filling station 19a which contains ricotta or chopped meat depending on the product desired. For the present, reference will be made to the production of ricotta or cheese manicotti, it being understood that meat manicotti can be made under the same operating and production conditions.

The quantity of cheese to be fed onto the moving dough sheet is regulated by measuring means 20. It is to be noted that the measuring means has spaced, outlet conduits 21, (only one conduit has been illustrated in FIG. 1) and 22 from each of which flow in spaced apart relationship a measured amount of the cheese 21a onto the moving dough sheet 12.

As the sheet 12 with a measured amount of cheese thereon is moving forwardly on belt 18 (to the left of FIG. 1), it passes a cutting station 23 provided with a cutting mechanism 24 which operates simultaneously in two ways. One cutter is so arranged that it cuts the dough sheet longitudinally into two long continuously moving sheets, while the other cutter, extending the width of the dough sheet, cuts it into two strips 25, so that each strip is somewhat oblong shaped as shown in FIG. 2.

It will be noted that the process utilizes both sides of the conveyor belt to obtain cut dough strips on each side of the belt.

In the meantime, as the strips 25 loaded with cheese thereon, in the form of a flattish cylinder, is carried to the left, as shown, the outer edge 26 passes over a relatively thin flipper means 35 and thereby over to cover the cheese. The moving strip 25, one on each side of the belt, then comes into contact with a guide guard 28 whose contour is such that the strip is passed through a squeeze 29 in which the flipped part of the dough strip is secure over the cheese. Squeezing means 29 by its action forms a uniformly rounded cylinder. In this operation, the inner part of strip 25 is still flat on the moving belt, and as it moves forwardly, it approaches a pusher 30 which is operated in unison with the slipper. The pusher moves inwardly toward the longitudinal center of the moving belt so as to roll the strip 25 to form a completed manicotti which is moving to the end of the belt 18 as shown in FIG. 1.

At this location, the completed manicotti which move in pairs are then taken off the belt and packed ready for refrigeration.

The process so described hereinabove is provided with novel cutting and shaping means, reference thereto being made to FIGS. 2, 3 and 4, which are sections of certain parts shown in FIG. 1. In FIG. 2, it will be noted that the dough strips 25 laden with cheese are moving with the belt operated by rollers 31 and 32 respectively in a left-handed direction of the drawing.

A table or support 33 is provided for said belt 18. On each marginal or longitudinal side of the table, is a raised disposed support member or bracket 34, containing oppositely disposed flippers 35, fixed to a shaft 36 which in turn is initially connected to a link or rod 37. Said link 37 in turn is pivotally connected to a vertically extending shaft 38 which is in turn connected to a cross-linkage member 39. Said member 39 is pivotally connected to a cam operated cam cylinder 40. Member 39 is pivoted to a bracket frame 41 acting as a fulcrum 42 fixed to a base support 43 for said members 39. It is to be noted that link 37, shaft 38 and member 39 are interconnected so that when cylinder 40 is actuated moving vertically up and down, flipper 35 is moved upwardly and forcefully so that the dough strip above the flipper is thrown thereby covering the cheese 21 and making contact with the inner part of the strip, said inner part of the dough strip being exposed for future action.

Said flipper 35 is preferably made of either highly polished steel or steel coated with a polytetrafluoroethylene resin or similar nonstick surface, in order to prevent the sticking of the dough to the flipper when used.

Guard guide members 28 having a curved cross-sectional outline as shown is adjustably mounted on a raised crossbar 45 fixed to table 33. Said member 28, it will be noted, guides the dough strip 25 partly folded over through a squeezer or squeezing means 29 similarly and adjustably mounted on crossbar 45. Said means 29 is disposed adjacent guide member 28 and insures that the strip 25 with its overturned flap 26 is substantially cylindrical as it is passed through squeezer means 29.

It will be noted that there are two sets of flipper, guide and squeezer means, one for each side of the conveyor belt to produce the manicotti in pairs.

Spaced from said guide 28 and squeezing means 29 on said bracket 34 is a pair of pusher means 30, one on each side of table 19; each in operable connection with operating shaft 36.

Said pusher means 30 is provided with rack and pinion gear means 47 operated by a cam rack gear 48 so that when cylinder 40 is actuated by suitable means, the pusher means are forced laterally of the moving belt and toward the longitudinal center thereof whereby the dough strip with partly covered cheese from one flap thereof is rolled over forming a complete manicotti.

The rack and pinion means can be adjustably connected so as to regulate the thrust force applied to the manicotti in the final stages of completion.

In the above embodiment, it will be noted that shaft 36 synchronously operates the flipper means and the pusher means, each of which is adjustable as to thrust and speed.

Also, the guide and squeezer means can be adjustably mounted on crossbar 45, said adjustments being dependent on the size of the manicotti to be made.

After the shaped product is obtained, it is then placed into containers, packaged and put into cold storage.

We claim:

1. In a manicotti-forming machine of the class described, comprising means for forming a continuous sheet of dough from a mass thereof, conveyor means for carrying the sheet of dough through a plurality of processing stations along a predetermined path defined by said conveyor means, cutting means adjacently arranged to one of said processing stations above the conveyor means for cutting the processed sheet of dough into increments of predetermined dimensions, during the displacement of the sheet of dough by said conveyor means, dispensing means adjacently disposed to the cutting means for dispensing and depositing controlled quantities of filler material into said cut dough increments, and in combination therewith, an upper supporting frame and a lower supporting frame, said conveyor means being partially positioned between said upper and lower supporting frame, and means mounted on the upper supporting frame along the predetermined path of said dough increments for engaging one side thereof and wrapping it over the filler material forming a semifinished product, said means comprising flipper members oppositely mounted on said upper frame at each side of the conveyor means path, and pusher means mounted forwardly of said flipper members at opposite sides of said conveyor means, said pusher means being movable in opposite directions transversely to the path of said semifinished product for rolling the same along its longitudinal axis to form a substantially cylindrical finished product, each flipper member and pusher means being operatively connected to a common actuating means for synchronous operation.

2. A machine as defined in claim 1, wherein said common actuating means comprises a pair of horizontal shafts rotatably mounted on said upper supporting frame, extended longitudinally along opposite sides of said conveyor means, each shaft having one end operatively connected to said flipper member and the other end operatively connected to said pusher means.

3. A machine as defined in claim 2, wherein said pusher means including a pair of reciprocal racks transversely extended to the upper supporting frame, pinion means for simultaneously displacing said racks in opposite directions towards and away from the path of said semifinished product, each rack being in meshed engagement with said pinion means, and gear cam means provided at one end of said horizontal shaft engaging said pinion means.

4. A machine as defined in claim 2, further comprising driving means for synchronously driving said flipper and pusher means, said driving means including a pair of vertically displaceable interconnecting members each one being adjacently arranged at opposite sides of said table, a pair of pivotal members each one having one end keyed to said horizontal shaft and the other end pivotally fixed to said interconnecting member, reciprocating means for displacing the interconnecting members up and down simultaneously, thereby driving said horizontal shafts in opposite directions.

5. A machine as defined in claim 4, further comprising linkage means operatively associated with said reciprocating means, said linkage means including a pair of lever members pivotally fixed on the lower supporting frame, each lever member having one end associated with said interconnecting member and the other end associated with said reciprocating means.

6. A machine as defined in claim 2, further comprising a raised portion supporting structure transversely and above said table having a pair of adjustable disposed squeezing means, each disposed in the path of said semifinished products.